(12) United States Patent
Hirayama

(10) Patent No.: US 6,229,919 B1
(45) Date of Patent: May 8, 2001

(54) CHARACTER DATA INPUT APPARATUS

(75) Inventor: Tomoshi Hirayama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/247,521

(22) Filed: May 23, 1994

Related U.S. Application Data

(63) Continuation of application No. 07/824,797, filed on Jan. 22, 1992, now abandoned.

(30) Foreign Application Priority Data

Jan. 22, 1991 (JP) .................................................. 3-022807

(51) Int. Cl.[7] ...................................................... G06K 9/00
(52) U.S. Cl. ............................................. 382/187; 382/189
(58) Field of Search .................................. 382/13, 36, 57, 382/59, 69, 187, 224, 309, 313, 189; 345/26, 141, 116, 192; 178/18

(56) References Cited

U.S. PATENT DOCUMENTS

| | | | |
|---|---|---|---|
| 4,573,196 | * 2/1986 | Crane et al. | 382/13 |
| 4,656,317 | * 4/1987 | Tsugei et al. | 178/18 |
| 4,953,225 | 8/1990 | Togawa et al. . | |
| 4,972,496 | * 11/1990 | Sklarew | 178/18 |
| 5,150,424 | * 9/1992 | Aguro et al. | 382/13 |
| 5,191,622 | * 3/1993 | Shojima et al. | 382/13 |

FOREIGN PATENT DOCUMENTS 0 254 561   1/1988   (EP) .

* cited by examiner

*Primary Examiner*—Bhavesh Mehta
(74) *Attorney, Agent, or Firm*—Sonnenschein, Nath & Rosenthal

(57) ABSTRACT

A character data input apparatus displaying a plurality of input characters in a plurality of areas of a display portion characterized in that the plurality of areas for displaying characters each have a first area for displaying the input character and a second area for displaying information related to the character displayed in the first area.

6 Claims, 22 Drawing Sheets

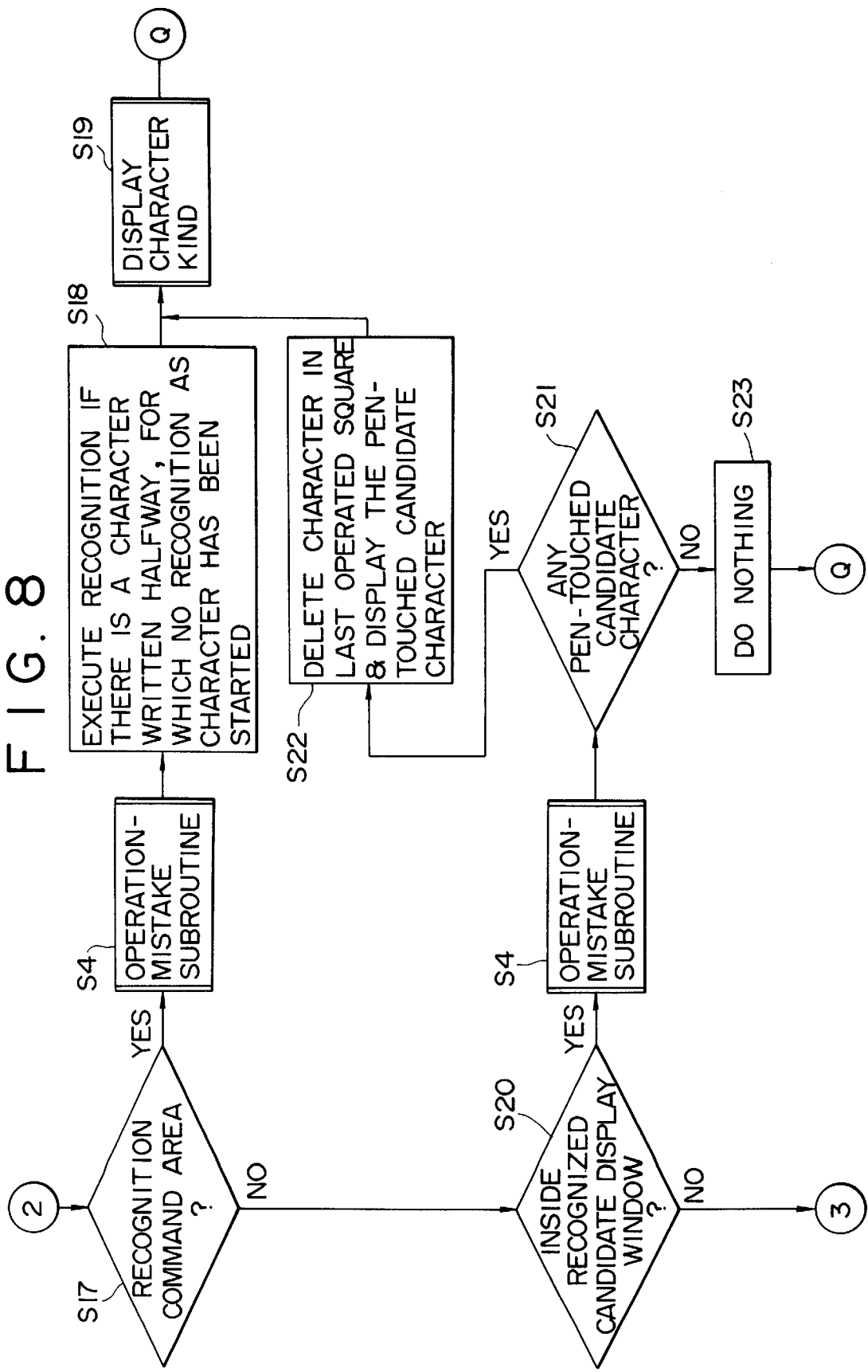

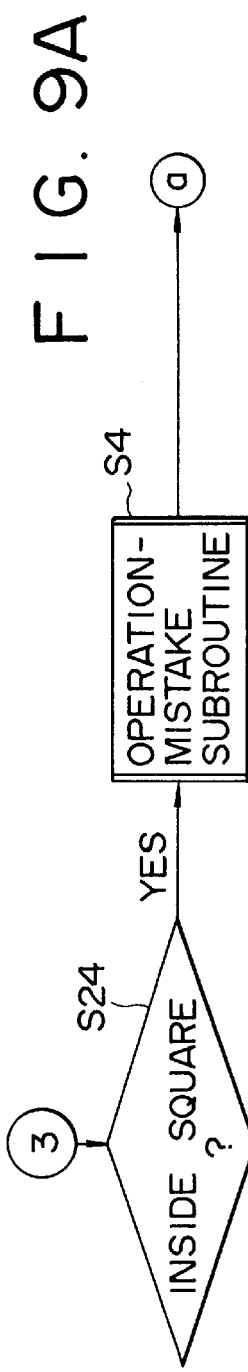
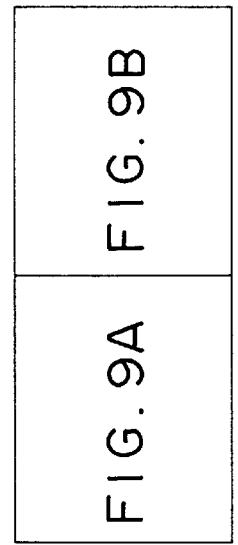

FIG.19A

| CODE OF CHARACTER KIND | PATTERN OF CHARACTER KIND |
|---|---|
| 0 | (space) |
| 1 | capital |
| 2 | number |
| 3 | mathematical |
| 4 | symbol |
| 5 | comma |
| 6 | period |
| 7 | hyphen |
| 8 | parenthesis |
| 9 | bracket |
| 10 | brace |
| 11 | Greek |
| 12 | Russia |
| 13 | Japanese |
| 14 | (reserved) |
| 15 | (reserved) |

FIG.19B

| CODE OF CHARACTER KIND | PATTERN OF CHARACTER KIND |
|---|---|
| 0 | (space) |
| 1 | capital |
| 2 | number |
| 3 | (reserved) |
| 4 | symbol |
| 5 | comma |
| 6 | period |
| 7 | (reserved) |
| 8 | (reserved) |
| 9 | bracket |
| 10 | brace |
| 11 | plus |
| 12 | minus |
| 13 | equal |
| 14 | semicolon |
| 15 | (reserved) |

F I G. 20A

| CODE | CHARACTER | DESCRIPTION (CHARACTER KIND PATTERN) |
|---|---|---|
| S2121 | (space) | (space) |
| | ､ ｡ : | Japanese |
| | ， ： | comma |
| | ． ： | period |
| | ・ ； ? ! ： | (space) |
| | ゛ ゜ ： | Japanese |
| | ´ ｀ ¨ ＾ ￣ ＿ ： | (space) |
| | ヽ ヾ ゝ ゞ 〃 仝 々 〆 〇 ー ： | Japanese |
| | — ： | (space) |
| | - ： | hyphen |
| | ／ ＼ ～ ‖ ｜ … ‥ ： | (space) |
| | ' ' " " : | (space) |
| | ( ) ( ) ： | parenthesis |
| | [ ] ： | bracket |
| | { } ： | brace |
| | 〈 〉 《 》 「 」 『 』 【 】 ： | (space) |
| | ＋ － ± × ÷ = ≠ < > ≦ ≧ ∞ ： | mathematical symbol |
| | ∴ ♂ ♀ ° ′ ″ ℃ ￥ $ ¢ £ % # & * @ § ： | symbol |
| | ☆ ★ ○ ● ◎ ◇ ◆ □ ■ △ ▲ ▽ ▼ ※ 〒 → ← ↑ ↓ = ： | symbol |
| $2238-$2241 | : | mathematical |
| $224A-$2250 | : | mathematical |
| $225C-$226A | : | mathematical |
| $2272-$2279 | : | symbol |
| $227E | : | symbol |
| | 0 1 2 3 4 5 6 7 8 9 ： | number |
| | A B C D E F G H I J K L M N ： | capital |
| | O P Q R S T U V W X Y Z ： | capital |
| | a b c d e f g h i j k l m n ： | (space) |
| | o p q r s t u v w x y z ： | (space) |
| $2421-$2473 | | Japanese |
| $2521-$2576 | | Japanese |
| $2621-$2638 | | Greek |
| $2641-$2658 | | Greek |
| $2721-$2741 | | Russia |
| $2751-$2771 | | Russia |
| $3021-$7424 | | Japanese |
| | . . . | |

FIG. 20B

| CODE CHARACTER | DESCRIPTION (CHARACTER KIND) |
|---|---|
| 20 (space) | (none) |
| 21 ! | (none) |
| 22 " | (none) |
| 23 # | (none) |
| 24 $ | (none) |
| 25 % | (none) |
| 26 & | (none) |
| 27 ' | (none) |
| 28 ( | (none) |
| 29 ) | (none) |
| 2A * | (none) |
| 2B + | plus |
| 2C , | comma |
| 2D - | minus |
| 2E . | period |
| 2F / | (none) |
| 30 0 | number |
| 31 1 | number |
| 32 2 | number |
| 33 3 | number |
| 34 4 | number |
| 35 5 | number |
| 36 6 | number |
| 37 7 | number |
| 38 8 | number |
| 39 9 | number |
| 3A : | colon |
| 3B ; | semicolon |
| 3C < | (none) |
| 3D = | equal |
| 3E > | (none) |
| 3F ? | (none) |
| 40 @ | |
| 41 A | capital |
| 42 B | capital |
| 43 C | capital |
| 44 D | capital |
| 45 E | capital |
| 46 F | capital |
| 47 G | capital |
| 48 H | capital |
| 49 I | capital |
| 4A J | capital |
| 4B K | capital |
| 4C L | capital |
| 4D M | capital |
| 4E N | capital |
| 4F O | capital |

FIG. 20C

| | | |
|---|---|---|
| 50 | P | capital |
| 51 | Q | capital |
| 52 | R | capital |
| 53 | S | capital |
| 54 | T | capital |
| 55 | U | capital |
| 56 | V | capital |
| 57 | W | capital |
| 58 | X | capital |
| 59 | Y | capital |
| 5A | Z | capital |
| 5B | [ | bracket |
| 5C | \ | (none) |
| 5D | ] | bracket |
| 5E | ^ | (none) |
| 5F | _ | (none) |
| 60 | ` | (none) |
| 61 | a | (none) |
| 62 | b | (none) |
| 63 | c | (none) |
| 64 | d | (none) |
| 65 | e | (none) |
| 66 | f | (none) |
| 67 | g | (none) |
| 68 | h | (none) |
| 69 | i | (none) |
| 6A | j | (none) |
| 6B | k | (none) |
| 6C | l | (none) |
| 6D | m | (none) |
| 6E | n | (none) |
| 6F | o | (none) |
| 70 | p | (none) |
| 71 | q | (none) |
| 72 | r | (none) |
| 73 | s | (none) |
| 74 | t | (none) |
| 75 | u | (none) |
| 76 | v | (none) |
| 77 | w | (none) |
| 78 | x | (none) |
| 79 | y | (none) |
| 7A | z | (none) |
| 7B | { | brace |
| 7C | \| | (none) |
| 7D | } | brace |
| 7E | ~ | (none) |
| 7F | | (none) |

CHARACTER DATA INPUT APPARATUS

This is a continuation, of application Ser. No. 07/824,797, filed Jan. 22, 1992 now abandoned.

BACKGROUND OF THE INVENTION

1. Field of the Invention

The present invention relates to a character data input apparatus suitable for use in a portable computer to which characters in handwriting can be input.

2. Description of the Related Art

FIG. 21 shows an example of structure of a character inputting means in a conventional portable computer. In a character input screen formed for example of an LCD and a tablet, there is displayed a type plate A as a window on a page plate F. The type plate A has a plurality of squares B. When a character handwritten with a pen E is input to a tablet in a square B where a character cursor C is located, a locus traced by the pen E is displayed in the square B. The traced locus is then subjected to pattern recognition and a character obtained as a result of the pattern recognition is displayed in the square B instead of the traced locus. In the present example, there are input and displayed characters "3", "A", and "-" in three squares B.

Here, it is difficult to determine whether the character "-" displayed in the third square B is a minus sign "–" or a hyphen "-". Therefore, there is provided a character kind indicator portion D at the lower right of the type plate A to indicate to which character kind of 'capital', 'number', 'symbol', and 'Greek' the character displayed in the square B where the character cursor C is located belongs. More specifically, when the character is a capital, the indicator for 'capital' is lighted. Likewise, when the character is a number, a symbol, or a Greek letter, the indicator for 'number', 'symbol', or 'Greek' is lighted. By looking at the display in the character kind indicator portion D, the user is enabled to determine that the character displayed in the square B where the character cursor C is located is 'capital' letter, 'number', 'symbol', or 'Greek' letter.

In the conventional character data input apparatus, as described above, it was arranged such that the kind of the character displayed in the square B where the character cursor C is located is displayed in the character kind indicator portion D. Since the type plate A has eight squares B, in order to know the kind of the character displayed in a square B, the character cursor C must be shifted to that square. This has been an inconvenience.

SUMMARY OF THE INVENTION

The present invention has been made in view of the above described situation. Accordingly, an object of the invention is to make it easier to recognize information related to the character such as character kind.

In order to achieve the above mentioned object, the character data input apparatus of the present invention of a type of character data input apparatus displaying a plurality of input characters in a plurality of areas of the display portion is arranged such that each of the plurality of character displaying areas has a first area for displaying the input character and a second area for displaying information related to the character displayed in the first area.

In the character data input apparatus of the above described arrangement, each of the plurality of areas in the display portion displaying a plurality of characters is divided into the first area and the second area. The input characters are displayed in the first areas and information related to the displayed characters is displayed in the second areas. Accordingly, the user can see information related to the plurality of characters at the same time.

BRIEF DESCRIPTION OF THE DRAWINGS

FIG. 8 is a flow chart explanatory of the operation of the embodiment of FIG. 5;

FIGS. 19A and 19B are tables showing examples of codes of character kind and corresponding character patterns of character kind;

FIGS. 20A to 20C are tables showing examples of characters and corresponding patterns of character kind.

DETAILED DESCRIPTION OF THE PREFERRED EMBODIMENTS

Figure 1:
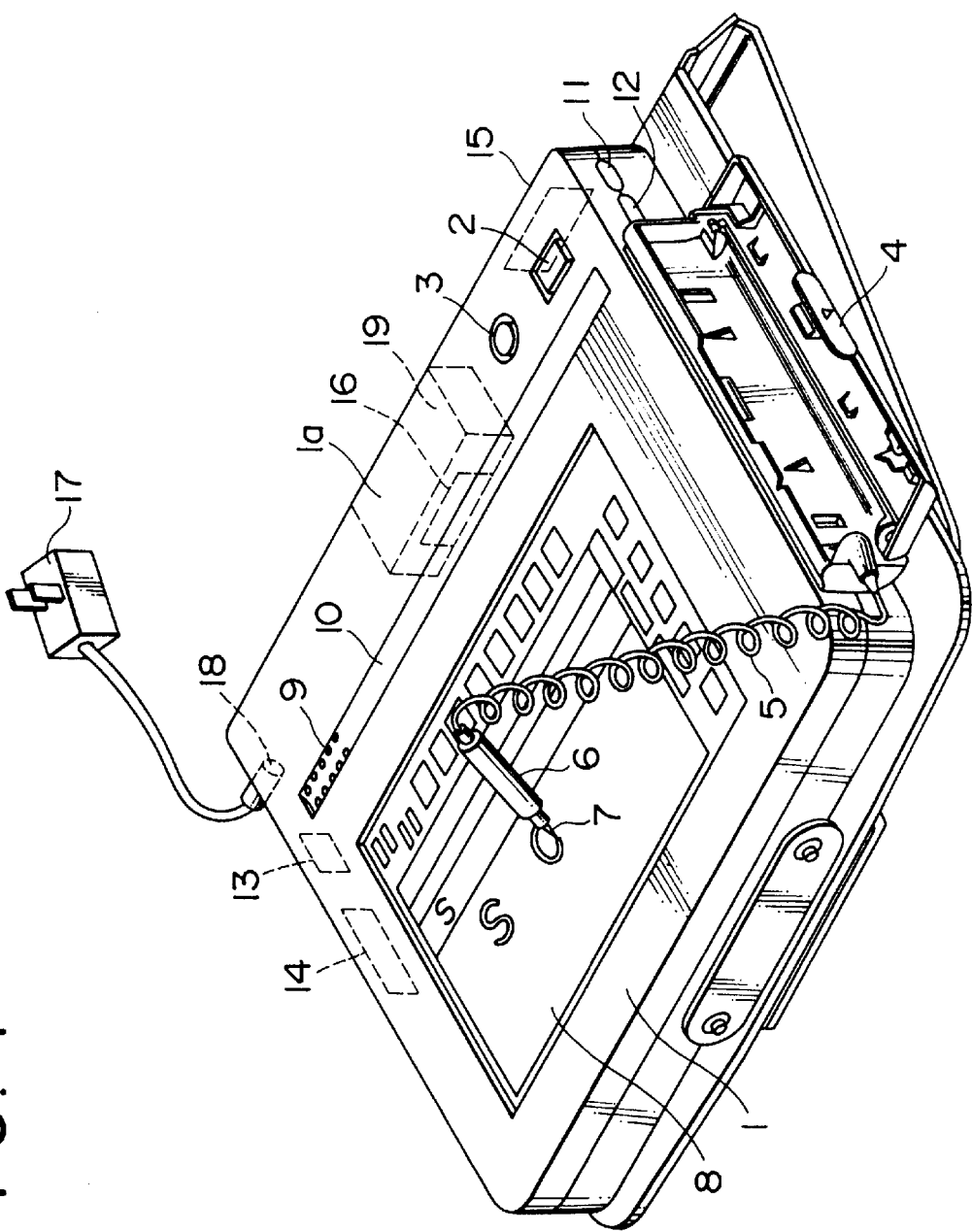
FIG. 1 a perspective view showing a structure of a portable computer to which a character data input apparatus of the present invention is applied.

FIG. 1 is a perspective view showing a structure of an embodiment of the present invention applied to a portable computer. The body 1 is provided with a power switch 2 which is turned on when the apparatus is used and turned off when it is not used. On the left-hand side of the power switch 2, there is provided a luminance adjustment switch 3 for adjusting the luminance of a screen 8 (the luminance of a later described LCD 22). On one side of the body 1, there is provided a case 4. This case is for receiving a pen 6 when it is not used. The pen has a switch 7 on its tip and connected with the body 1 through a cord 5. The pen 6 when taken out from the case 4 can be be placed in a groove 10 provided horizontally on the body 1 toward the front end. On the left-hand side of the groove, there is provided a speaker 9 which is adapted to output a preset sound.

There are provided switches 11 and 12 on the right-hand side face of the body 1 toward the front. The switch 11 is a change-over switch for switching the brightness of the later described back light between for example two steps and the switch 12 is a volume changeover switch for switching the volume of the sound output from the speaker 9 between for example three steps. A switch 13 provided on the left-hand side face of the body 1 is a stop switch to be used for stopping a specific operation midway (for example, when stopping a sound while it is being output). In the left-hand side face, there is provided a socket 14 into which a memory (IC) card 70 (refer to FIG. 5) is to be mounted. In the front face of the body 1, there is provided a socket 15. Also, there is a socket 16 in the interior of a battery receiving portion 1a provided in the front face of the body 1 in which a battery 19 is to be inserted. To the socket 15 and 16, the cable and modem of the RS232C type, adapter, etc. are adapted to be connected. On the left-hand side face of the body 1 toward the front, there is provided a connection terminal 18 for an AC adapter 17.

Figure 2:
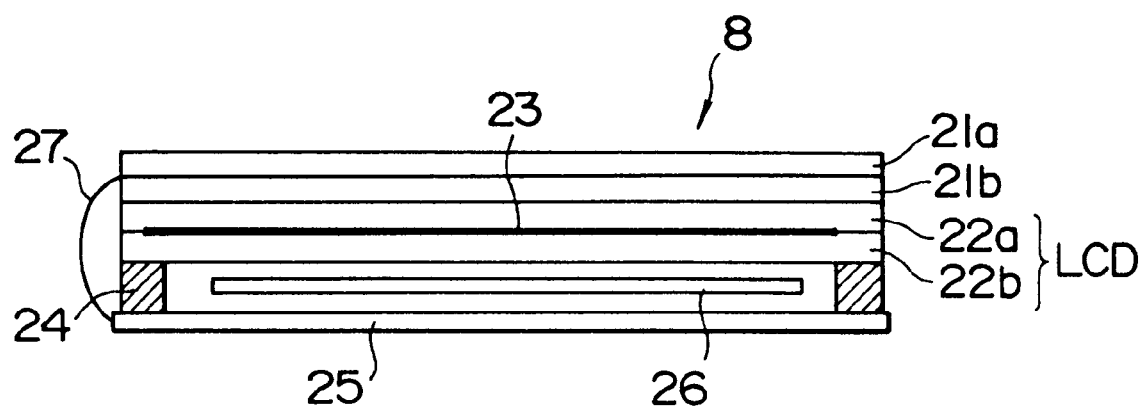
FIG. 2 is a sectional view showing a structure of an embodiment of an input screen in FIG. 1.

FIG. 2 is a diagram showing the structure of the screen 8 in more detail. In the present embodiment, a tablet 21 (formed of a tablet 21a for detecting position in the direction of X-axis and a tablet 21b for detecting position in the direction of Y-axis) is provided at the topmost level. Below the tablet 21, there is provided an LCD 22. The LCD 22 is formed of an upper glass plate 22a and a lower glass plate 22b with a liquid crystal 23 sandwiched therebetween. Below the LCD 22, there is disposed a fluorescent plate (EL) 26. When the fluorescent plate 26 as the back light emits light, the light illuminates the LCD 22. Since the tablets 21a and 21b are formed of transparent materials, the image displayed on the liquid crystal 23 can be seen in the direction from the top of the drawing. Parts not shown are arranged in a printed-circuit board (PCB) 25 and electrically connected with the LCD 22 through a rubber connector 24. It is also connected with the tablet 21 through a conductive film 27.

Figure 3:
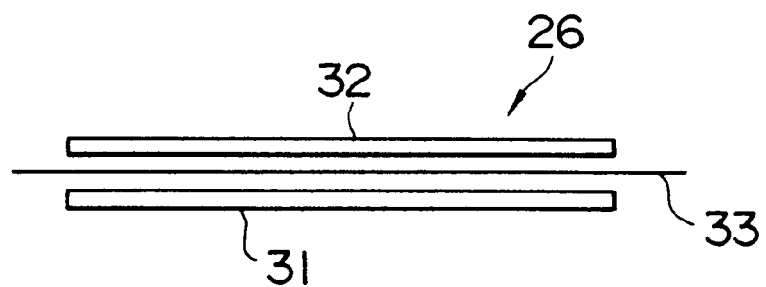
FIG. 3 is a sectional view showing a structure of a fluorescent plate in FIG. 2.

FIG. 3 is a diagram showing the structure of the fluorescent plate 26 in more detail. In the present embodiment, an insulating film 33 is disposed between one electrode 31 and a luminescent part (the other electrode) 32. The luminescent part 32 emits light when a predetermined voltage is applied between the electrode 31 and the luminescent part 32. The electrode 31 and the luminescent part 32 are made in plate form and capable of illuminating the screen 8 uniformly.

As another source of the back light, fluorescent tubes can be used. It is also possible to arrange fluorescent tubes as side light source on the sides of the body and transmits the light therefrom to the back side of the LCD 22 through a light transmitting material.

Figure 4:
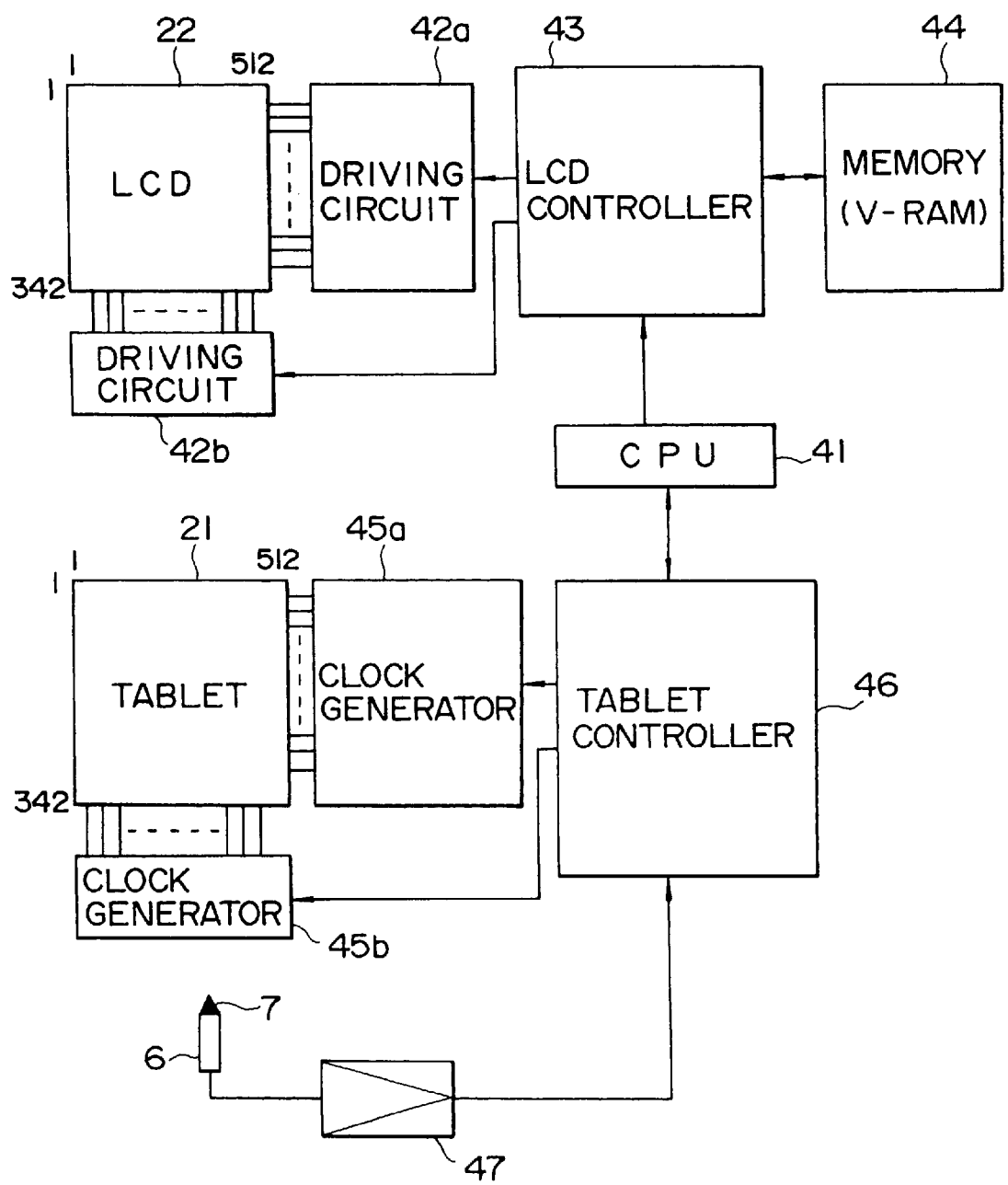
FIG. 4 is a block diagram showing a structure related to control of a tablet and an LCD in the embodiment of FIG. 1.

FIG. 4 is a circuit diagram showing the principle of position detection by means of the tablet and display of images by means of the LCD. The tablet 21 has for example 512 electrodes juxtaposed in the direction of X-axis and 342 electrodes juxtaposed in the direction of Y-axis. It is thereby made possible to detect 512×342 pixels. A tablet controller 46 controls a clock generator 45a to apply a predetermined voltage to each of the 342 electrodes in succession. Then, a clock generator 45b is controlled so that voltage is applied to each of the 512 electrodes in succession. Thus, the tablet 21 is scanned by means of the clocks generated by the clock generator 45a and the clock generator 45b. When the pen 6 is brought close to a specific position above the tablet 21, a certain amount of electrostatic capacity is generated between the tablet 21 and the pen 6. When the pen 6 is pressed against the tablet 21, the switch 7 on the tip of the pen 6 is turned on and electric charges generated between the pen 6 and a specific electrode on the tablet 21 are detected and supplied to the tablet controller 46. Since the tablet controller 46 is controlling the timing of clock generation from the clock generators 45a and 45b, it can detect the position on the tablet 21 pressed by the pen 6 from the detection signal supplied from the pen 6 and the clock generation timing. The thus detected coordinate data of the movement of the pen 6 is supplied to the CPU 41.

The CPU 41 also controls an LCD controller 43 and writes the data corresponding to the image to be displayed into a memory (V-RAM) 44. The LCD controller 43 reads the data from the memory 44 and supplies signals corresponding to the data to a driving circuit 42b. The LCD 22 has 512 electrodes juxtaposed in the horizontal direction and 342 electrodes juxtaposed in the vertical direction corresponding to the tablet 21. A driving circuit 42a supplies a predetermined voltage to each of the 342 electrodes in succession. Meanwhile, the driving circuit 42b supplies each of the 512 electrodes with voltages corresponding to the image data in succession. The pixels on the LCD 22 are scanned in such manner and thus a predetermined image is displayed on the LCD 22.

Figure 5:
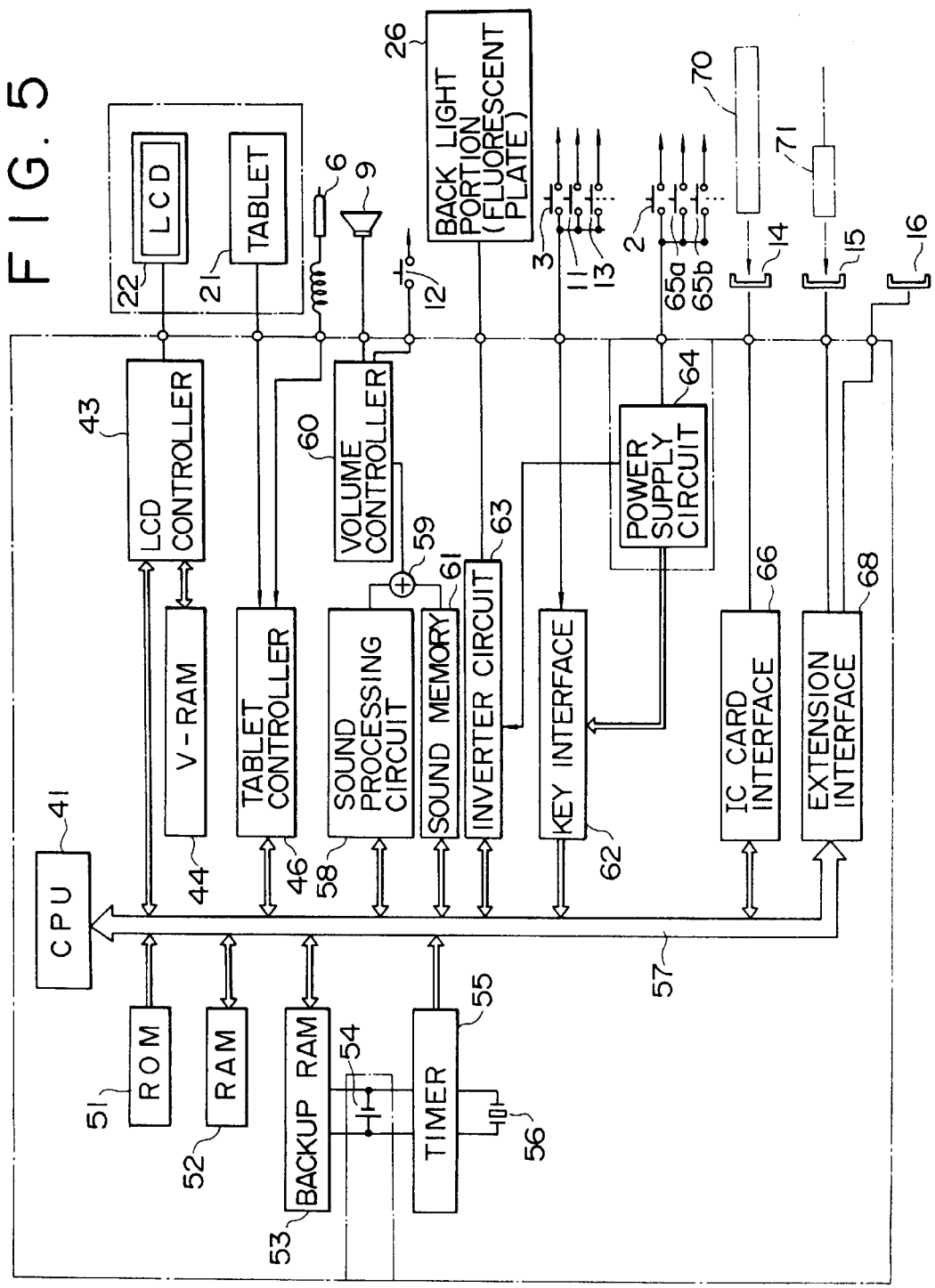
FIG. 5 is a block diagram showing an overall internal electric structure of the embodiment of FIG. 1.
Figure 6:
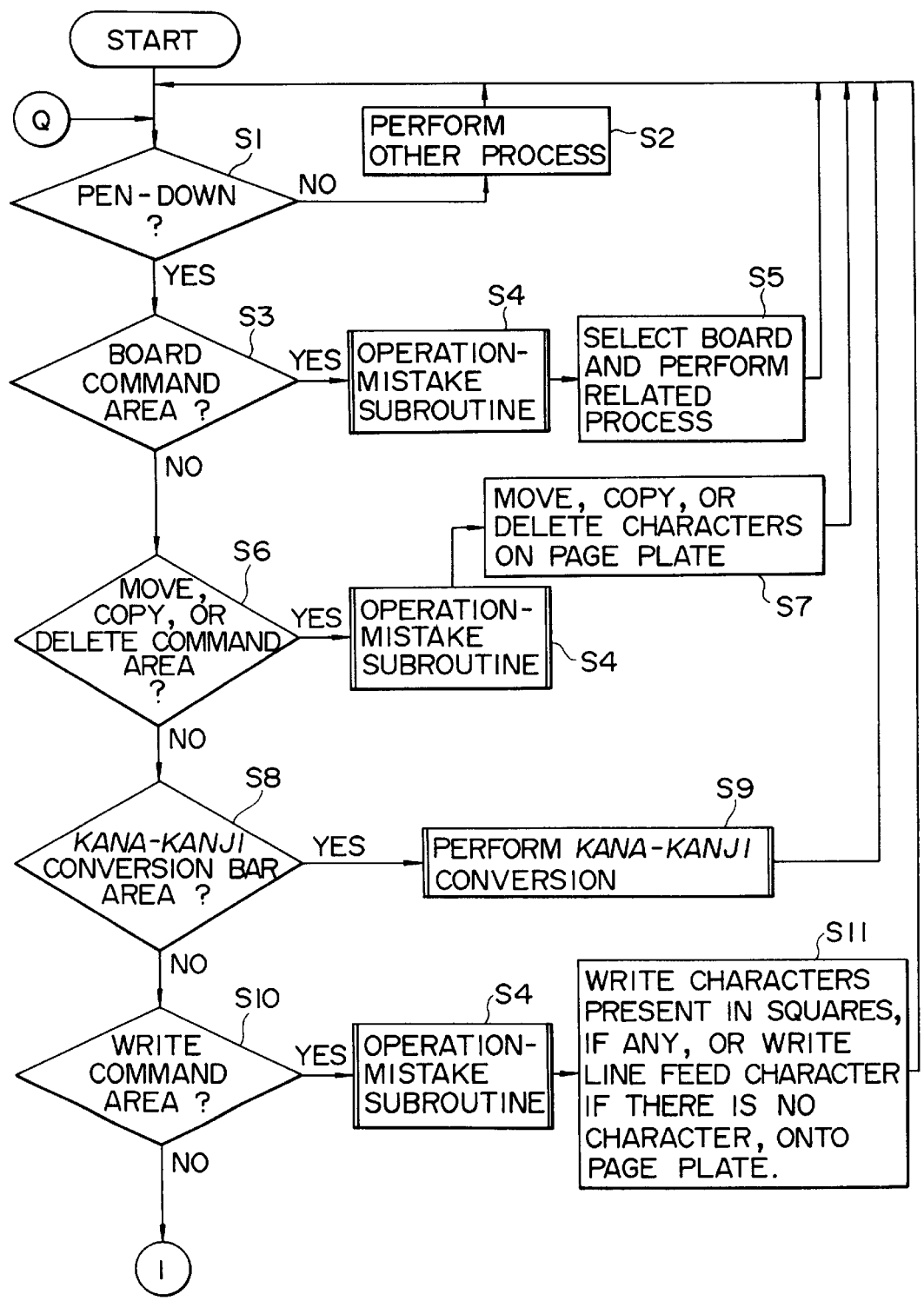
FIG. 6 is a flow chart explanatory of the operation of the embodiment of FIG. 5.
Figure 7:
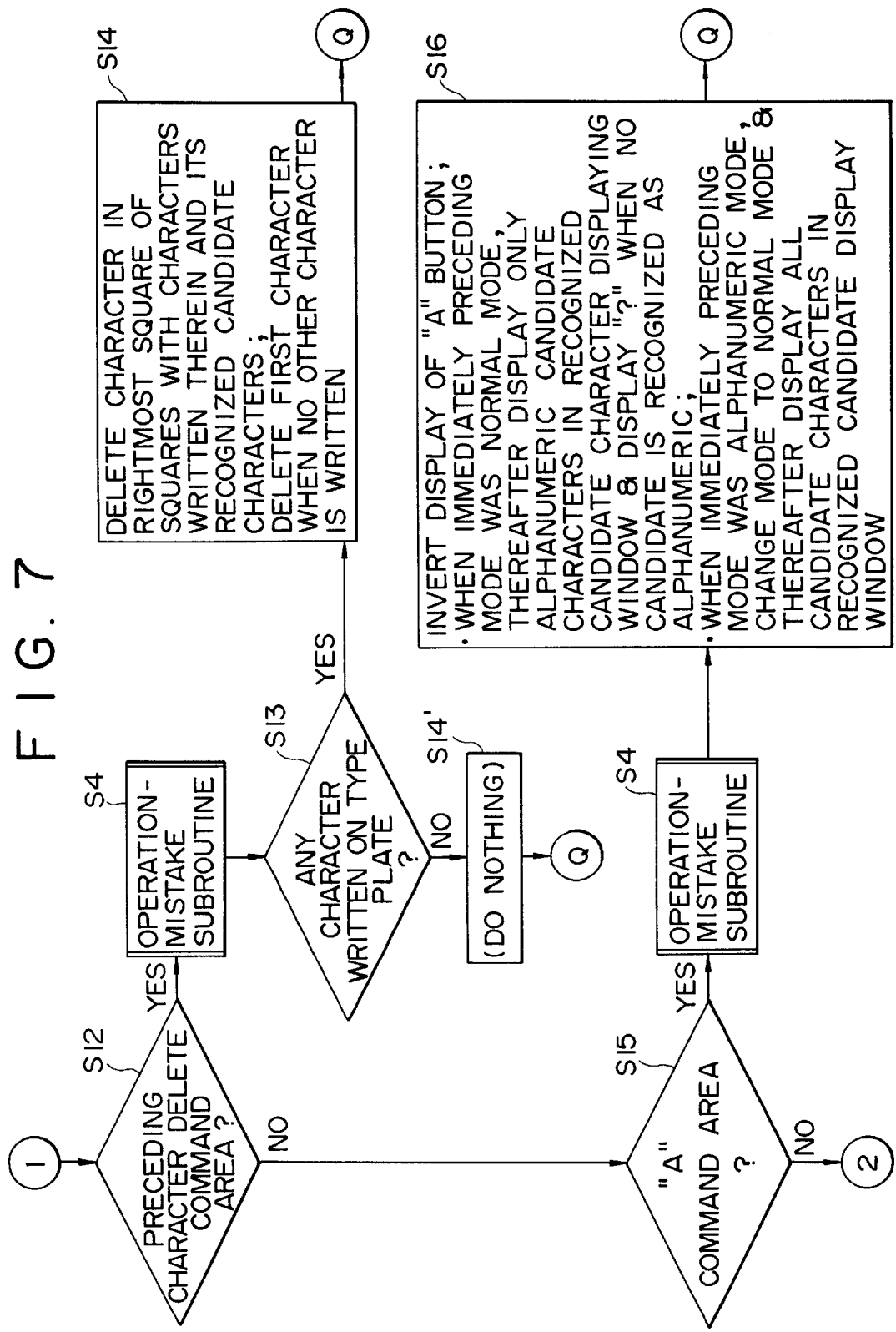
FIG. 7 is a flow chart explanatory of the operation of the embodiment of FIG. 5.
Figure 9B:
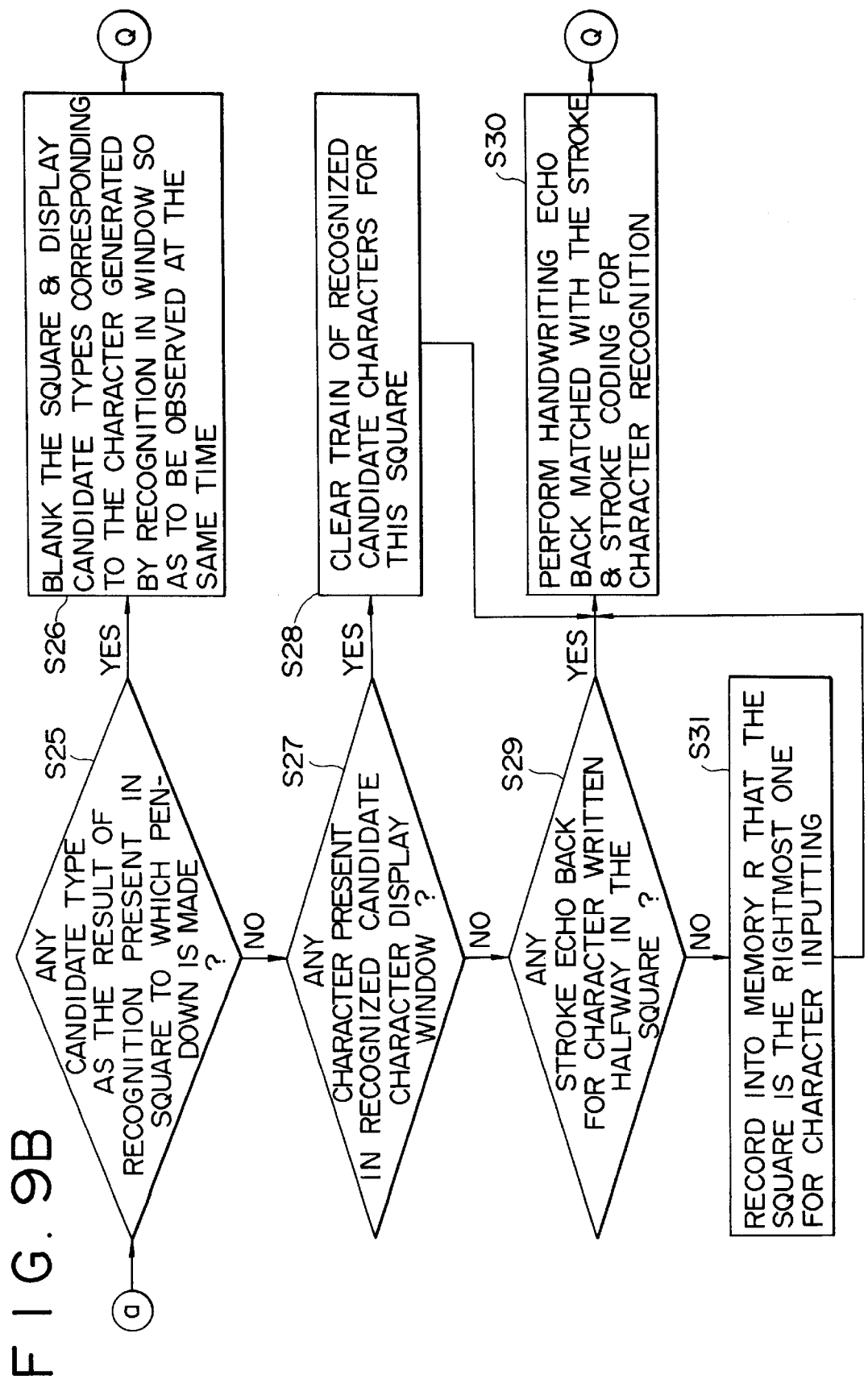
FIG. 9 is a flow chart explanatory of the operation of the embodiment of FIG. 5.

FIG. 5 is a diagram showing the electric circuit configuration of the body 1 in more detail. The CPU 41 is connected with various ICs and others through a bus line 57. A ROM 51 previously stores a system program for the whole of the apparatus and further stores a kana-kanji conversion program and a dictionary table therefor for a word processing function, a recognition program for handwritten input and a dictionary table therefor, and others. Into a working RAM 52, data necessary for operation are written when necessary. A backup RAM 53 is connected with a backup battery 54 (separate from the battery 19) whereby necessary data are backed up even when the power supply to the entire apparatus goes off. A timer IC 55 is connected with the battery 54 and counts clocks from a quartz oscillator 56 and outputs data of the current date and time of the day. The above described LCD controller 43 and tablet controller 46 are also connected with the CPU 41 through the bus line 57.

A sound processing circuit 58 generates predetermined sound signals corresponding to inputs from the sockets 14 to 16 and commands from the CPU 41 and supplies them to an adder 59. A sound memory 61 is controlled by the CPU 41 and outputs predetermined sounds (for example "Eh ?") previously stored therein to the adder 59. The adder 59 adds up the output from the sound processing circuit 58 and the output of the sound memory 61 and outputs the sum to the speaker 9 through a sound volume controller 60. The sound volume controller is connected with the volume change-over switch 12, so that the sound volume is controlled by operating the switch.

The fluorescent plate (back light portion) 26 is supplied with power from a power supply circuit 64 (which is supplied with power from the battery 19 or AC adapter 17 when the power switch 2 is turned on) through an inverter circuit 63. The brightness of the fluorescent plate 26 is switched by operating the change-over switch 11 between two steps (for example, brightness suitable for use in a light room and that suitable for use in a dark room) through the inverter circuit 63. Separate from this, the brightness of the LCD 22 is adapted to be controlled in multiple steps by controlling the luminance adjustment switch 3. A switch 65a is turned on/off depending on whether the battery 19 mounted in the body 1 is a primary battery or it is a secondary battery. A switch 65b is turned on/off depending on detected capacity of the battery 19. The switches 65a, 65b, etc. are connected with a key interface 62 through the power supply circuit 64. The key interface 62 is also connected with the luminance adjustment switch 3, change-over switch 11, stop switch 13, etc. The key interface 62 supplies the CPU 41 with signals corresponding to on/off states of these switches.

An IC card 70 is connected to the socket 14, and the CPU 41 is adapted to supply and receive data, program, etc. to and from the IC card 70 through an IC card interface 66. The socket 15 and 16, to which an adapter 71 is connected, is connected to the CPU 41 through an expansion interface 68.

Figure 12:
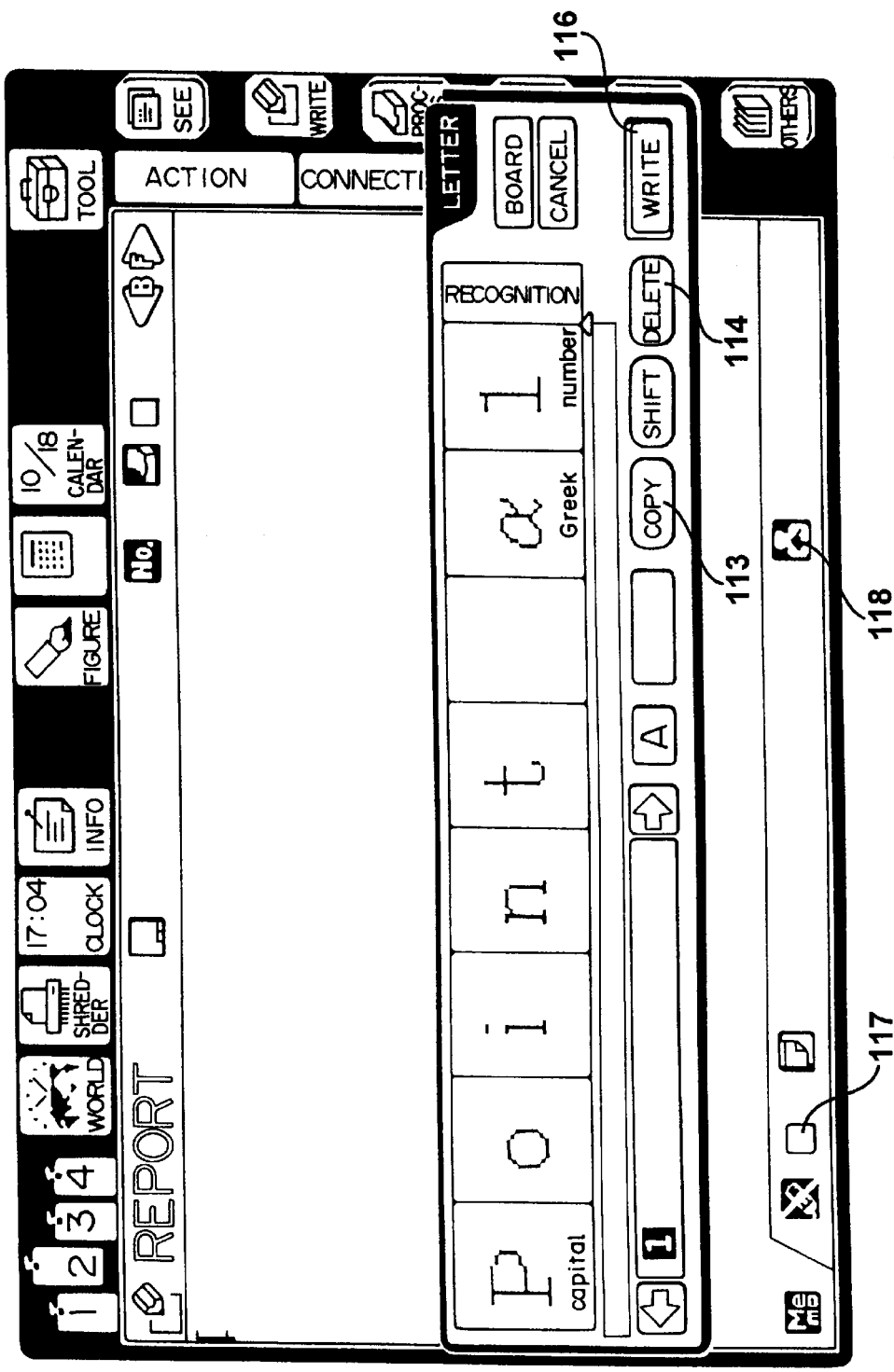
FIG. 12 is a drawing showing an example of display in a screen of the computer shown in FIG. 5.
Figure 13:
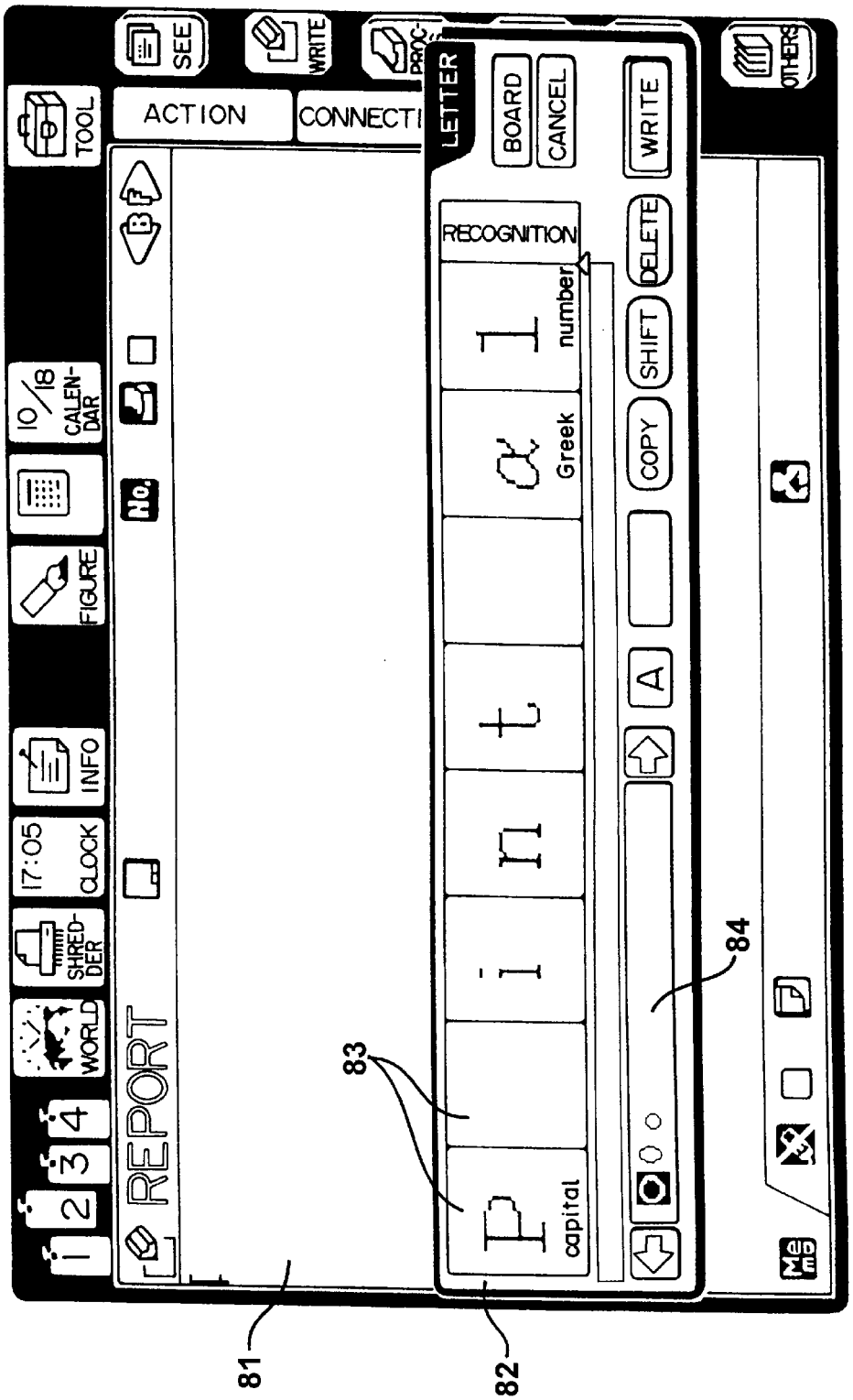
FIG. 13 is a drawing showing an example of display related to a delete operation on the screen of the computer shown in FIG. 5.

FIG. 6 to FIG. 10 show operations of the portable computer shown in FIG. 1 to FIG. 5. FIG. 12 to FIG. 14 show contents of display on the input screen 8 at each of the steps of operations shown in FIG. 6 to FIG. 10. The operations will be described below with reference to these drawings.

First, when the CPU 41 detects a pen-down state, i.e., that the pen 6 is brought in touch with the tablet 21, through the tablet controller 46 (YES in step S1), it decides whether or not the position of pen-down is a board command area (button) 111 (S3). The board command means an input mode changing command. When the CPU 41 decides that it is the board command area (YES in S3), an operation-mistake subroutine shown in FIG. 10 is executed (S4).

Figure 11:
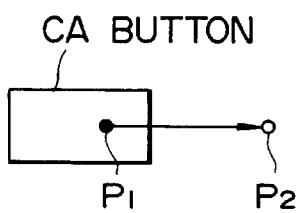
FIG. 11 is an explanatory drawing showing a relation between a pen-down position and a pen-up position when an error sound is generated in the operation shown in FIG. 10.

In the operation-mistake subroutine, the CPU 41 first registers the name of the touched command area ("board" in the present case) in the memory M (S41). The CPU 41, then, decides whether there is a pen-up state, i.e., whether the pen 6 is separated from the tablet 21 (S42). When the pen is separated (YES in S42), the CPU 41 decides whether or not the position where the pen-up took place is within the command area registered in the memory M (S43). When the pen-up position $P_2$ is outside the command area CA including the preceding pen-down position $P_1$ (NO in S43), as shown in FIG. 11, an error sound "Eh ?" is generated (S44) and the routine returns to the start point. When the pen-up position is inside the command area registered in the memory M (YES in S43), the CPU 41 performs selection of the board, i.e., the input mode (handwriting mode, facsimile mode, telephone mode, or the like), and the related process (S5).

Figure 10:
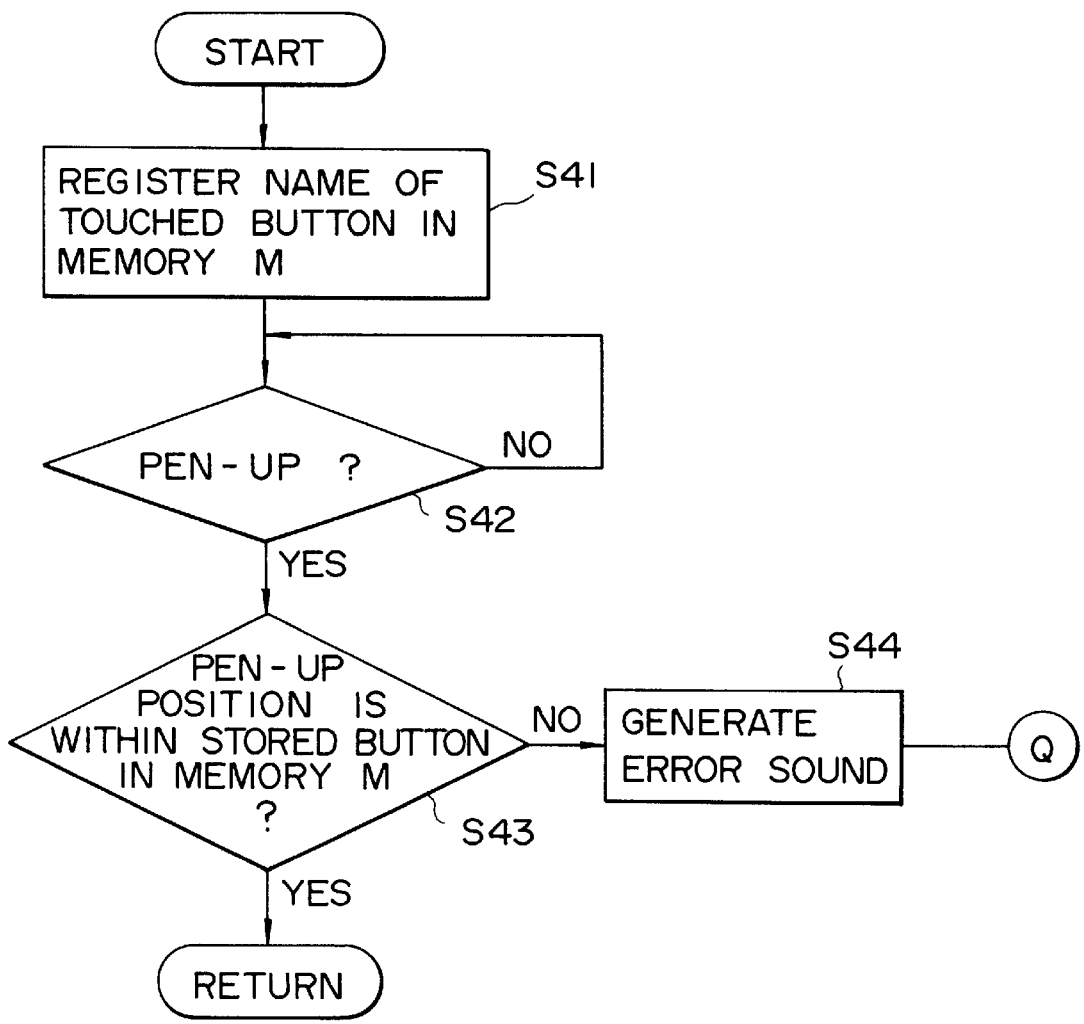
FIG. 10 is a flow chart explanatory of the operation of the embodiment of FIG. 5.

When the pen-down position is not the board command area (NO in S3), the CPU 41 decides whether the pen-down position is a move, copy, or delete command area 112, 113, or 114 (S6), and if the position is one of them (YES in S6), it, after executing the operating mistake subroutine S4 of FIG. 10, moves, copies, or deletes the characters in a page plate (data display area) 81 (S7).

When the pen-down position is not any one of the move, copy, and delete command areas 112, 113, and 114 (NO in S6), the CPU 41 decides whether or not the pen-down position is a kana-kanji conversion bar area 115 (S8), and if it is (YES in S8), it executes the kana-kanji conversion (S9).

When the pen-down position is not the kana-kanji conversion bar area 115 (NO in S8), the CPU 41 decides whether or not the pen-down position is a write command area 116 (S10), and if it is (YES in S10), it, after executing the operation-mistake subroutine of FIG. 10, writes characters, if any, present in the squares 83 or a line feed character when there is no character therein, onto the page plate 81 (S11).

When the pen-down position is not the write command area 116 (NO in S10), the CPU 41 decides whether or not the pen-down position is a preceding character delete command area 117 (S12), and if it is (YES in S12), it, after executing the operation-mistake subroutine of FIG. 10, checks whether or not there is a character written on a type plate 82 (S13). If there is (YES in S13), the CPU 41 deletes the character in the rightmost square 83 stored in the memory R (in which the character is written) and recognized candidate characters for that character and, then, recognizing the next square on the left-hand side as the rightmost square, records this square into the memory R, and when no letter other than the fist character is written, the CPU 41 deletes that character (S14), If there is no letter written on the type plate 82 (NO in S13), the CPU 41 does nothing (S14').

When the pen-down position is not the preceding character delete command area 117 (NO in S12), the CPU 41 decides whether or not the pen-down position is an "A" command area 118 (S15), and if it is (YES in S15), it, after executing the operating mistake subroutine S4 of FIG. 10, causes the display of the "A" command area 118 to invert. The CPU 41, when the mode immediately before that was a normal mode, thereafter displays only alphanumeric characters out of all candidate characters in a recognized candidate character display window (window) 84. The CPU 41 displays "?" when it has no candidate when recognizing the written character as any alphanumeric character. When the mode immediately before was the alphanumeric mode, the CPU 41 changes the mode to the normal mode and thereafter displays all candidate characters in the recognized candidate character display window 84 (S16).

When the pen-down position is not the "A" command area (NO in S15), the CPU 41 decides whether or not the pen-down position is within a recognition command area 119 (S17), and if it is (YES in S17), it, after executing the operating mistake subroutine S4 of FIG. 10, recognizes, if there is a character written halfway for which recognition as a character has not yet been started, stroke coding data (S18) and displays the character kind (S19).

When the pen-down position is not in the recognition command area 119 (NO in S17), the CPU 41 decides whether or not the pen-down position is within the recognition candidate character display window 84 (S20), and if it is (YES S20), it, after executing the operating mistake subroutine S4 of FIG. 10, decides whether or not there is a pen-touched candidate character (S21). If there is (YES in S21), the CPU 41 deletes the character in the last operated square and outputs the code of the pen-touched candidate character (S22). When there is no pen-touched candidate character (NO in S21), the CPU 41 does nothing (S23).

When the pen-down position is not in the recognition candidate character display window 84 (NO in S20), the CPU 41 decides whether or not the pen-down position is within a square 83 of the type plate 82 (S24). If it is not within any square 83 (NO in S24), other processes are executed in S31 and the subroutine returns to S1. When it is within a square 83 (YES in S24), the CPU 41, after executing the operating mistake subroutine S4 of FIG. 10, decides whether or not there is present a candidate character as the result of recognition in the square 83 (S25). If there is (YES in S25), the CPU 41 makes the square 83 blank, i.e., deletes the candidate character in the square 83, and displays types of candidate characters corresponding to writing with pen for that character generated by character recognition in the recognized candidate character display window 84 so as to be observed at the same time (S26).

FIG. 13 shows a state brought about from the state shown in FIG. 12 by making pen-down to the second square from the left, whereby the character "o" in that square was deleted and candidate types for the character, "O" (capital letter O), "0" (zero), and "o" (small letter o) are displayed in the display window 84.

When there is no candidate character obtained as the result of recognition in the square 83 to which pen-down is made (NO in S25), the CPU 41 decides whether there is present any character in the recognized candidate character display window 84 (S27), and if there is (YES in S27), it clears (deletes) the train of recognized candidate characters for that square (S28). Then, if a character is written for example in the second square 83 from the left, the CPU 41 executes echo back (displays the focus) for handwriting matched with the stroke, executes stroke coding for character recognition, and stores the obtained code (S30).

Figure 14A:
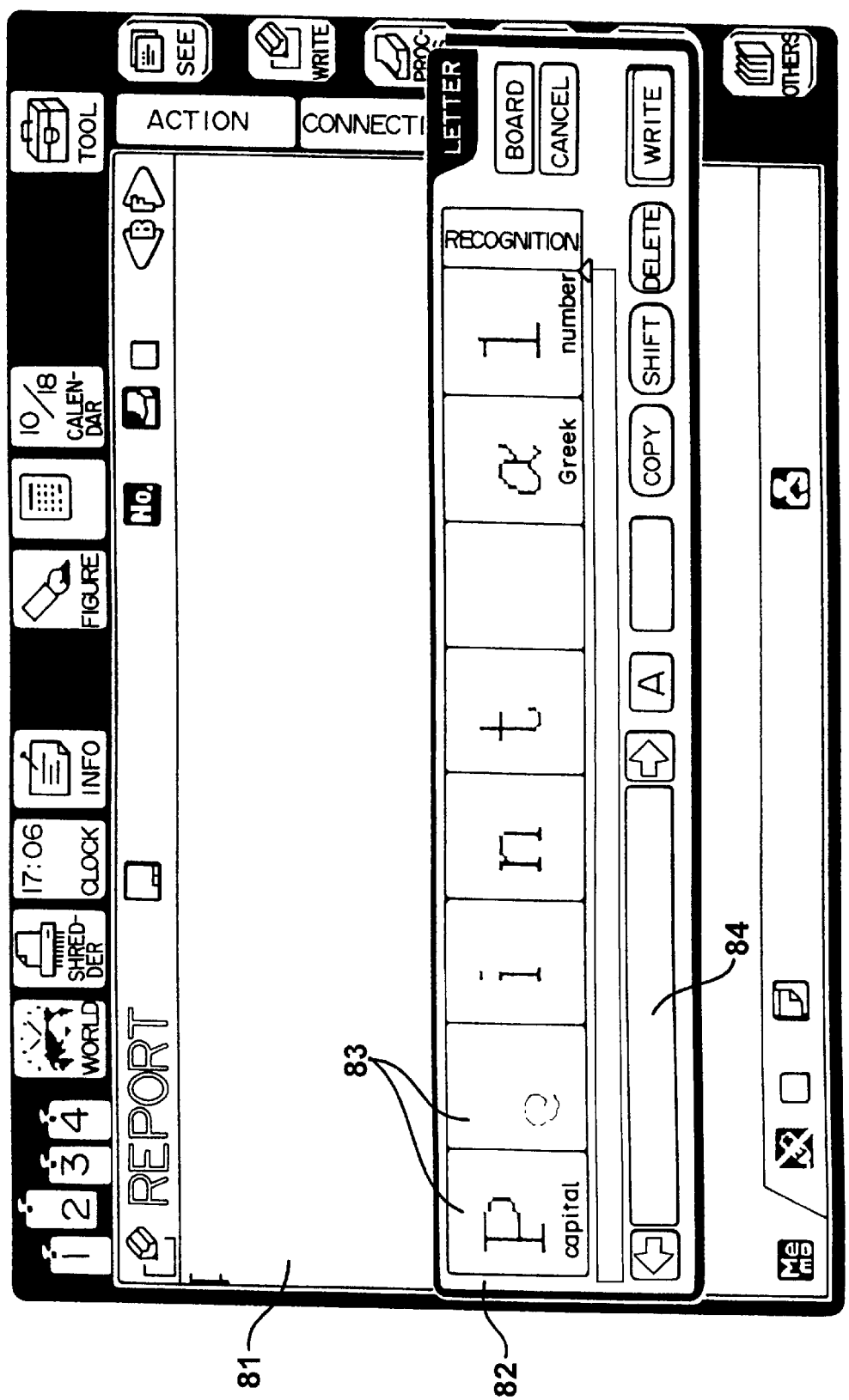
FIGS. 14A and 14B are drawings showing an example of handwritten inputting through a stroke coding operation for character recognition of a character on the screen of the computer shown in FIG. 5.
Figure 14B:
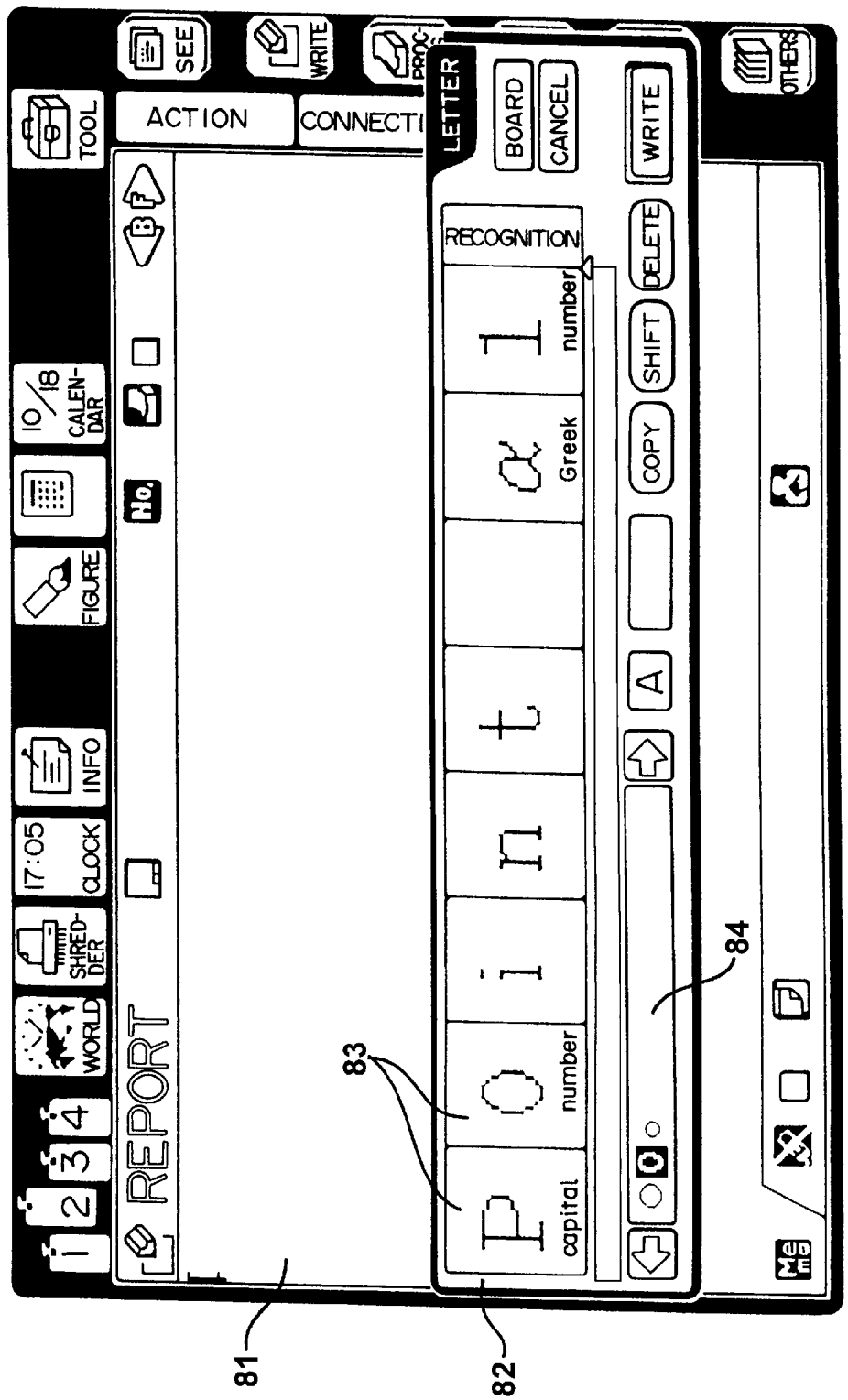

For example, referring to FIG. 14A, though it was intended to write the capital letter "O" in the second square from the left, the result was numerical character "0" (zero), but the capital letter "O", and the small letter "o", etc. as the second andidates are indicated in the candidate display window.

When there is no character in the recognized candidate character display window 84 (NO in S27), the CPU 41 decides whether or not there is a stroke echo back for a character written halfway in the square 83 (S29), and if there is (YES in S29), the process in the above described step S30 is performed. If not (NO in S29), the CPU 41 records in the memory R that this square is the one at the rightmost end for inputting character (S31).

Figure 15:
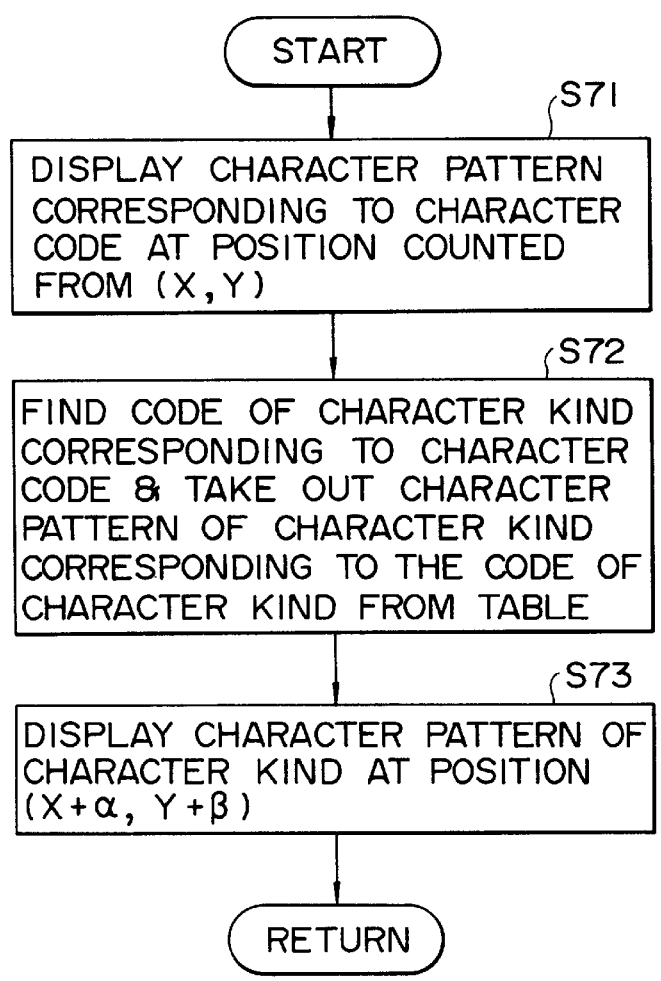
FIG. 15 is a flow chart explanatory of an operation of the embodiment of FIG. 5.
Figure 16:
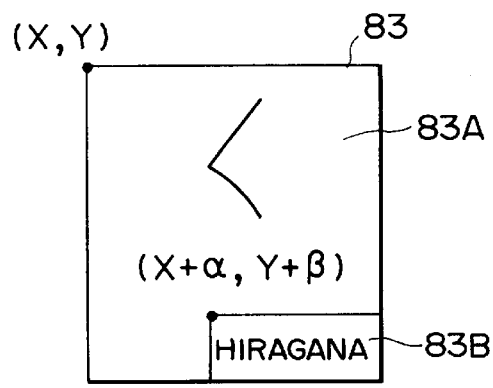
FIG. 16 is a plan view of a square explanatory of the processing in FIG. 15.

FIG. 15 shows the steps of processing in the character kind displaying subroutine (step S19) in FIG. 8. In step S71, the character pattern corresponding to the character code obtained as the result of pattern recognition is displayed in the area 83A of the square 83 in which a handwritten input has been made. The displayed position of the character pattern is calculated from the coordinates (X, Y) of the upper left corner of the square 83. In the embodiment shown in FIG. 16, a hiragana "く" is written in the area 83A with the coordinates (X, Y) used as a reference.

Then, in the next step S72, the code of character kind of the displayed character is found and the character pattern of character kind corresponding to the code of character kind is taken out from a table.

More specifically, as shown in FIG. 19A and FIG. 19B, there are provided 16 codes from 0 to 15 as the codes of character kind. (The table of FIG. 19A shows codes of character kind and character patterns of character kind assigned to the codes in the case where JIS character codes are used. Such table is to be made in different arrangement according to the character codes used. FIG. 19B is an example when 7-bit ASCII character codes are used.) Two codes of them are reserved and, to the remaining 14 codes, patterns of character kind such as "capital" and "number" are assigned. Further, as shown in FIGS. 20A, 20B, and 20C, each character is related to its code of character kind. (For convenience, patterns of character kind instead of codes of character kind are shown related to characters. FIG. 20A is a table showing an example in which the character font by JIS standards is used. (Refer to JIS character code as separate material.) The example shown is that of assignment in which the internal codes of the used code characters happened to be JIS codes. When the character code system is of a 7-bit type, setting as shown in FIGS. 20B and 20C is also possible. FIGS. 20B and 20C show an example in which the character font based on the standard 7-bit ASCII code table is used. Characters in this example do not include Russian letters and Greek letters, but, instead, include minutely divided expressions of mathematical symbols and the like. The table itself shows the ASCII character font, and therefore, a separate code table such as the JIS code table is not required.) Thus, in step S72, the code of character kind corresponding to the recognized and displayed character is read and the pattern of character kind corresponding to the code of character kind is taken out from the table.

In the next step S73, the pattern of character kind taken out in step S72 is displayed at the position of the coordinates (X+α, Y+β). The coordinates (X+α, Y+β) represent the position of the upper left corner of the area 83B of the square 83. In the embodiment shown in FIG. 16, a hiragana "く" is displayed in the area 83A and, hence, the character pattern of character kind "hiragana" corresponding to the character "く" is displayed in the area 83B. The user can therefore realize that the character displayed in the area 83A is the hiragana "く" and is prevented from mistaking it for the mathematical symbol "<".

Figure 17:
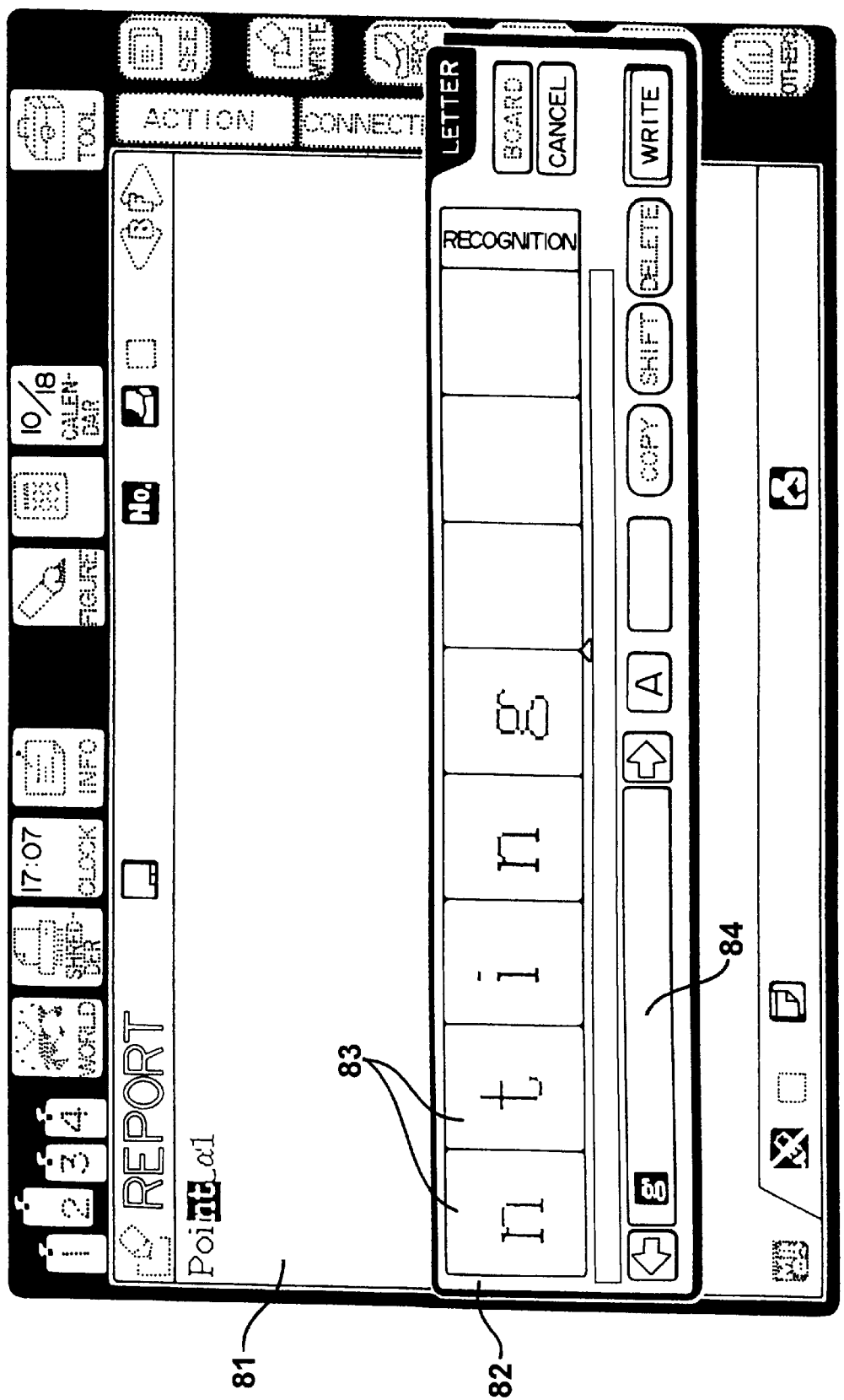
FIG. 17 is a plan view of the input screen explanatory of the processing in FIG. 15.

Further, particular examples of display will be described below with reference to FIG. 17 and FIG. 18. Referring to FIG. 17, there are displayed a page plate 81 and a type plate 82, as a window, on the input screen 8 formed of the tablet 21 and the LCD 22. On the page plate 81, there are displayed characters "Point, α1". There is shown a state where the pen 6 was dragged on the portion "nt" of these characters for correction, whereby the display of the two characters "nt" are inverted, and the correcting characters obtained as the result bf pattern recognition of handwritten characters with the pen input to the five squares 83 are displayed there. As a result, characters "Pointing, α1" can be obtained.

Figure 18:
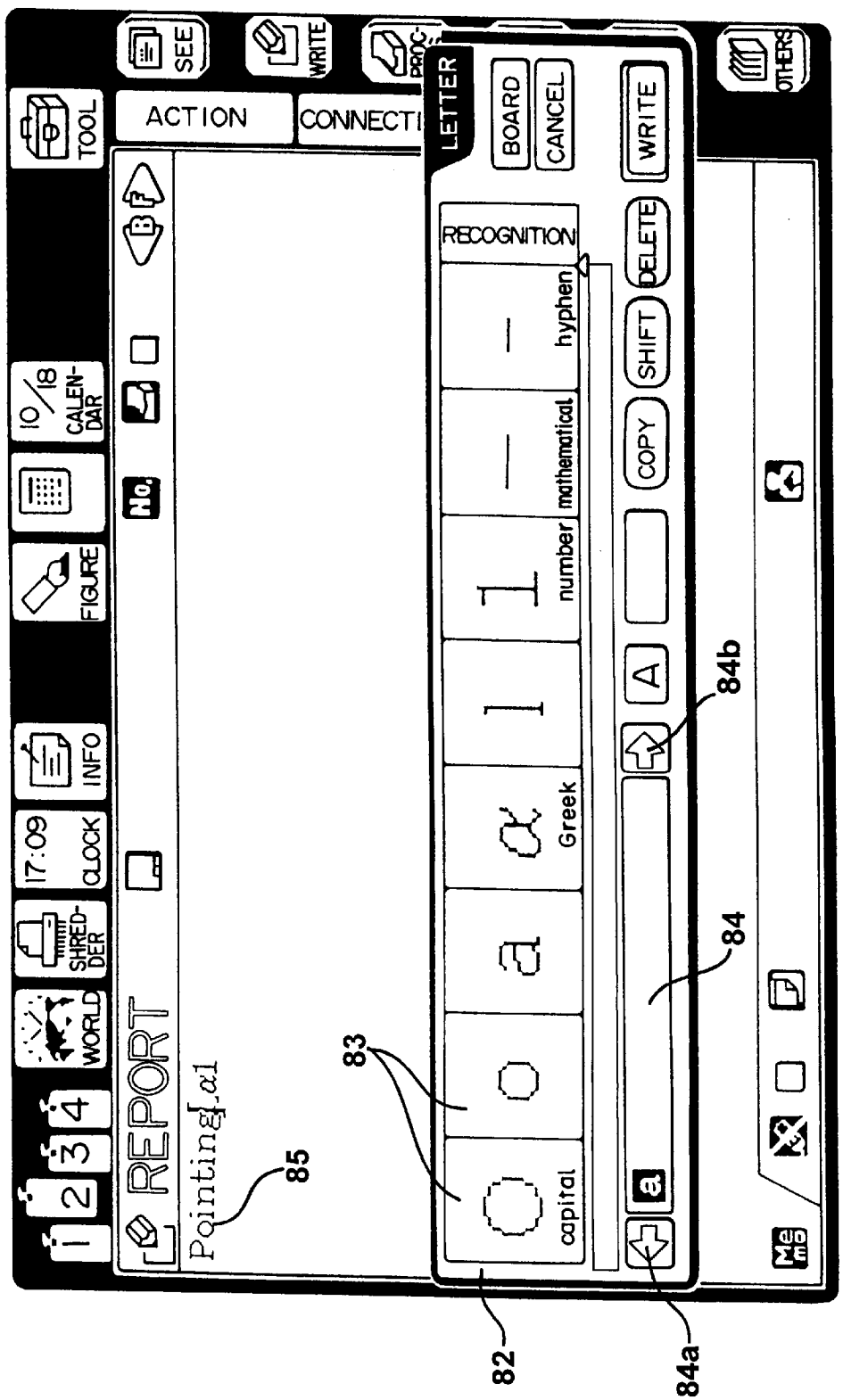
FIG. 18 is a plan view of the input screen explanatory of the processing in FIG. 15.
Figure 21:
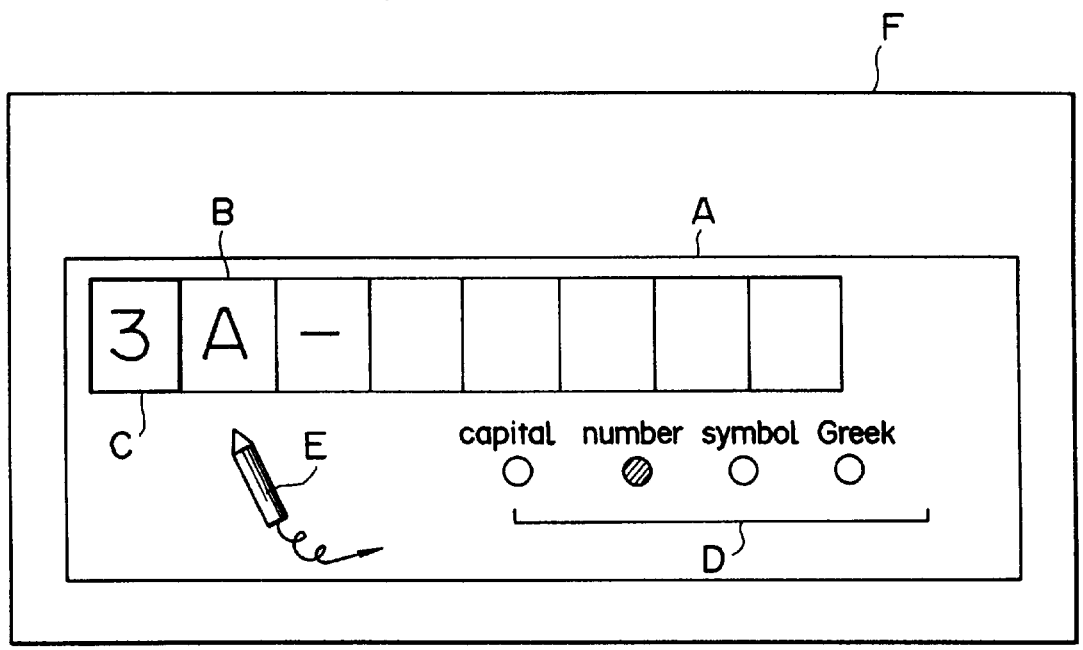
FIG. 21 is a plan view showing an example of structure of a conventional character data inputting apparatus.

Referring to FIG. 18, there are successively displayed "O", "o", "a", "α", "l", "1", "-", and "–" in the eight squares 83 of the type plate 82. Since some of them are liable to be mistaken for other characters, indications of "capital", "Greek", "number", "mathematical", and "hyphen" as the character patterns of character,kind are attached to them. Since each of the displayed characters, when it is a character liable to be mistaken for another character, is displayed with its character pattern of character kind contiguous thereto as described above, the possibility for the user to mistake each character for another character can be reduced.

The type plate 82 is provided with a cursor 85. Candidate characters obtained as the result of pattern recognition of the square 83 where the cursor 85 is located are displayed in the recognized candidate character display window 84. Of a plurality of candidate characters, that indicated by inverted display is displayed in the square 83. Selection of the candidate character to be displayed in the square 83, i.e., selection of the candidate character to be displayed inversely out of the plurality of candidate characters in the candidate character display window 84, is achieved by touching either of the arrow marks 84a and 84b provided at the left-hand end and right-hand end of the window 84 with the pen 6 to thereby shift the inverted display portion, from one character to the next, in the direction of the arrow 84a or 84b (leftward or rightward).

Although, in the above described embodiment, it was arranged such that the character pattern of character kind is displayed together with the character only in the square 83 of the type plate 82, it is possible, when the character on the page plate 81 is sufficiently large, to arrange such that the character patterns of character kind are also displayed on the page plate 81 together with the characters. In such case, since it is possible that the original characters become difficult to read if the character patterns of character kind are displayed at all times, a certain button may be provided on the page plate 81 and such an arrangement may be made that the character patterns of character kind are displayed when the button is touched and they are all put out when the button is touched again.

Although, in the above described embodiment, it was arranged such that the character pattern of character kind is displayed corresponding to the displayed character, it is also possible to display other information related to the displayed character, such as pronunciation and etymology.

According to the character data input apparatus of the present invention as described above, there are provided a first area and a second area for each of a plurality of areas for displaying a plurality of characters and it is arranged such that a character is displayed in the first area and information related to the character is displayed in the second area. Since information related to a plurality of characters can be observed at the same time, operability of the apparatus can be improved.

What is claimed is:

1. A character data input apparatus comprising:
   a memory for storing together codes of characters and character kind identifiers for distinguishing characters of different kinds, each of said identifiers corresponding to a plurality of said characters of the same kind;
   a display for displaying together said characters and their corresponding character kind identifiers;
   means for inputting a hand written character:
      a controller responsive to said input means for outputting a character and its corresponding character kind identifier from said memory;
      a first area in said display for displaying one said character; and
      a second area in said display for displaying said character kind identifier individually associated with said one character wherein said one character may be distinguished from a character of similar appearance, but of a different kind.

2. A character data input apparatus according to claim 1, further comprising an input device for inputting data for generating said character code.

3. A character data input apparatus according to claim 2, wherein said input device is formed of a pen device and a tablet.

4. A character data input apparatus comprising:
   a pen for inputting character information by a handwritten trace;
   a tablet for detecting information of a trace made thereon with said pen;
   a memory for storing codes of characters and character kind identifier information corresponding to said characters for distinguishing characters of different kinds;
   a display formed under said tablet for displaying an image which is visible through said tablet; and
   a controller for recognizing said character information to thereby convert it to said character code; wherein
      said display has first and second areas for displaying said characters and their corresponding character kind identifiers and said controller executes control for outputting said characters in said first areas and said character kind information individually for each of said characters in said second areas,
      wherein said first and second areas are provided for each said character and arranged contiguously to each other and
      wherein said first and second areas are provided for each said character and arranged contiguously to each other.

5. A character data input apparatus according to claim 4, wherein
   said character kind information is composed of a character pattern of said character kind and character kind code of said character.

6. A character data input apparatus according to any of claims 1 to 5, wherein said apparatus is a portable computer apparatus.

* * * * *